(12) United States Patent
Takeshima et al.

(10) Patent No.: US 8,500,109 B2
(45) Date of Patent: Aug. 6, 2013

(54) VIBRATION DAMPING SUPPORT APPARATUS

(75) Inventors: Toshihiro Takeshima, Yokohama (JP); Tatsuya Hayashida, Isehara (JP); Akio Nakakura, Yokohama (JP)

(73) Assignees: Bridgestone Corporation, Tokyo (JP); Nissan Motor Co., Ltd., Yokohama-shi (JP)

( * ) Notice: Subject to any disclaimer, the term of this patent is extended or adjusted under 35 U.S.C. 154(b) by 897 days.

(21) Appl. No.: 12/296,881

(22) PCT Filed: Apr. 10, 2007

(86) PCT No.: PCT/JP2007/057917
§ 371 (c)(1),
(2), (4) Date: Oct. 10, 2008

(87) PCT Pub. No.: WO2007/117013
PCT Pub. Date: Oct. 18, 2007

(65) Prior Publication Data
US 2009/0174126 A1     Jul. 9, 2009

(30) Foreign Application Priority Data
Apr. 12, 2006   (JP) ................... 2006-109608

(51) Int. Cl.
*B60G 11/22*   (2006.01)
(52) U.S. Cl.
USPC ........................................ 267/293

(58) Field of Classification Search
USPC ............. 267/293, 140, 140.11, 140.3–140.4, 267/141.4, 153
See application file for complete search history.

(56) References Cited

U.S. PATENT DOCUMENTS 7,198,256 B2 * 4/2007 Tatura et al. ............. 267/140.13

FOREIGN PATENT DOCUMENTS

| JP | 61-85735 U | 6/1986 |
|---|---|---|
| JP | 61-133141 U | 8/1986 |
| JP | 63-155725 U | 10/1988 |
| JP | 01-57906 U | 4/1989 |
| JP | 05-172175 A | 7/1993 |
| JP | 09-126259 A | 5/1997 |
| JP | 2001-200892 A | 7/2001 |
| JP | 2004-278750 A | 10/2004 |
| JP | 2004-293664 A | 10/2004 |
| WO | 02/42662 A1 | 5/2002 |

* cited by examiner

*Primary Examiner* — Anna Momper
(74) *Attorney, Agent, or Firm* — Foley & Lardner LLP

(57) ABSTRACT

A first load transmission surface 54 and a second load transmission surface 56 are each formed as a flat surface extending parallel to a load input direction. Therefore, elastic deformation occurring in each of an outer body part 66 and an inner body part 68 in a stopper elastic body 64 includes a main component of a shear deformation component, and a secondary component of a compressive and tensile deformation component that is small relative to the shear deformation component. Consequently, a sharp increase in deformation resistance and dynamic spring constant when a high load is input can be effectively suppressed.

10 Claims, 6 Drawing Sheets

FRONT-REAR DIRECTION LOAD-DEFECTION GRAPH

VIBRATION DAMPING SUPPORT APPARATUS

TECHNICAL FIELD

The present invention relates to a vibration damping support apparatus for elastically connecting a vibration generating portion to a vibration receiving portion side, and for supporting a load input from the vibration generating portion to the vibration receiving portion.

RELATED ART

In vehicles such as automobiles, a power unit, including the main vibration generation source of the engine, is supported to the vehicle body through a vibration damping support mechanism, in order to suppress vibration transmission from the power unit to the vehicle body, and to thereby realize superior ride comfort and protect various components mounted to the vehicle body side from vibration and impact load transmitted from the power unit. Such vibration damping support mechanisms generally are configured with plural mounting devices using elastic rubber bodies. One known type of such a mounting device is an engine torque rod (referred to below simply as "torque rod") input with load that is mainly torque reaction force from the power unit, mounted to the vehicle body by plural engine mounts etc.

For example, in embodiments employed in most FF type vehicle (front-engine, front-drive type) power unit supports of inertial main axis type and similar types, a peripheral portion of the power unit away from the torque axis it elastically connected to the vehicle body, limiting the displacement amount of the power unit relative to the vehicle body in the rolling direction shock absorption (see, for example, patent documents 1 and 2).

There are torque rods as described above provided with a stopper portion for limiting relative displacement in the load input direction between a first mounting member connected to the power unit side and a second mounting member connected to the vehicle body side. In such as stopper portion, when a high load is input from the power unit to the torque rod during vehicle acceleration, a stopper that is connected to one or other of the first mounting member or the second mounting member through a rubber stopper elastic body, prevents a large displacement occurring of the power unit in the roll direction by contacting and pressing against the other of the first mounting member or the second mounting member.

The torque rod of patent document 3, for example, is a known example of one of the torque rods provided with a stopper portion as described above. In the torque rod describe in patent document 3, when a first rubber elastic body (main elastic body) deforms due to load input between a first mounting member and a second mounting member in the compression direction there is a second rubber elastic body (stopper elastic body), acting as a stopper portion for the main elastic body formed within a circular cone trapezoidal shaped space, and there is also a stopper fitting vulcanize bonded to an end portion at the smaller diameter side of the stopper elastic body. When there is a large displacement of the first mounting member relative to the second mounting member in the compression direction, the first mounting member transmits the input load to the stopper elastic body through the stopper fitting, elastically deforming the stopper elastic body, and reducing the internal volume of the air in a second air chamber provided within the stopper elastic body while compressing the air in the second air chamber.

When this occurs, since the stopper elastic body is formed within the circular cone trapezoidal shaped space, elastic deformation (compression and shear deformation) occurs including both a deformation component along the shear direction (shear deformation component) and a component along the compression direction (compression deformation component), with the air within the second air chamber acting as an air spring. Consequently, in the torque rod of patent document 3, a sudden increase in the deformation resistance of the stopper elastic body during high load input is suppressed, and the spring constant is suppressed from becoming a high value.

Patent Document 1: Japanese Patent Application Laid-Open No. 2001-200892
Patent Document 2: International Publication No. WO2002/042664
Patent Document 3: Japanese Patent Application Laid-Open No. 2004-293664

DISCLOSURE OF THE INVENTION

Problem to be Solved by the Invention

However, in the torque rod described in patent document 3, when elastic deformation occurs in the stopper elastic body this elastic deformation includes both a shear deformation component and a compression deformation component, and the proportion of the deformation components made up by compression deformation component increases as the displacement amount increases in the stopper elastic body. Due to this, when the displacement amount of the stopper elastic body has increased to a given amount there is a sudden increase in the rigidity and the dynamic spring constant of the stopper elastic body for increased input load, and the ability to block impact load and vibration for displacement between a power unit and vehicle body in the roll direction between becomes insufficient.

In consideration of the above circumstances, an object of the present invention is to provide a vibration damping support apparatus capable of effectively suppressing a sudden increase in the rigidity and the dynamic spring constant of a stopper elastic body for an increase in input load when there is a large displacement amount of the stopper elastic body.

Method of Solving the Problem

In order to achieve the above objective, a vibration damping support apparatus according to a first aspect of the present invention is a vibration damping support apparatus for elastically connecting a vibration generating portion to a vibration receiving portion side, and for supporting a load input from the vibration generating portion to the vibration receiving portion. The vibration damping support apparatus includes: a first mounting member connected to one or other of the vibration generating portion or the vibration receiving portion; a second mounting member connected to the other of the vibration generating portion or the vibration receiving portion; a main elastic body, disposed between the first mounting member and the second mounting member, and elastically deforming due to input of a load to the first mounting member or to the second mounting member along a specific load input direction; a stopper member, disposed so as to face the first mounting member along the load input direction; load transmission surfaces, formed to portions at both ends of the stopper member in a load orthogonal direction that is orthogonal to the load input direction, the load transmission surfaces extending in a direction intersecting with the load orthogonal direction; load bearing surfaces, formed to the second mounting member so as to face the load transmission surfaces and be parallel to the load transmission surface; and a stopper elastic body, manufactured from rubber, bonded to each of the respective load transmission surfaces and the load bearing surfaces, and elastically connecting the stopper member and the second mounting member to each other.

Explanation will now be given of the operation of the vibration damping support apparatus according to the first aspect of the present invention.

In the vibration damping support apparatus of the first aspect there is a stopper elastic body bonded to the load transmission surfaces of the stopper member and bonded to the load bearing surfaces of the second mounting member, and elastically connecting the stopper member and the second mounting member to each other. The load transmission surfaces are formed so as to extend in a direction intersecting with the load orthogonal direction at both ends in the load orthogonal direction of the stopper member disposed so as to face the first mounting member along the load input direction, and the load bearing surfaces are formed on the second mounting member so as to face the first load transmission surfaces and so as to be parallel to the load transmission surfaces.

Consequently, in the vibration damping support apparatus of the first aspect, when load is input along the load input direction to the first mounting member or to the second mounting member, the main elastic body elastically deforms along the load input direction, and the first mounting member displaces relative to the second mounting member along the load input direction. As this occurs, when the displacement amount of the first mounting member in the load input direction becomes that of the initial separation in the load input direction between the stopper member and the first mounting member, or a greater amount, the first mounting member contacts the stopper member and load is transmitted to the stopper elastic body through the stopper member.

The stopper member, to which load has been applied, elastically deforms in the load input direction between the load transmission surfaces of the stopper member and the load bearing surfaces of the second mounting member. Since the load transmission surfaces and the load bearing surfaces each extend in a direction that intersects with the load orthogonal direction, and are also mutually parallel to each other, it can be set such that the elastic deformation occurring in the stopper elastic body includes a main component of a shear deformation component, and a secondary component of a compressive and tensile deformation component, being slight in comparison to the shear deformation component. Consequently, since a sharp increase in the proportion of the compressive and tensile deformation component can be prevented even when there is an increase in the load applied in the compression direction, a sharp increase in the rigidity and spring constant of the stopper elastic body for an increase in input load can be prevented, even when a high load is input with a large displacement amount of the stopper elastic body.

The vibration damping support apparatus according to a second aspect of the present invention is a vibration damping support apparatus for elastically connecting a vibration generating portion to a vibration receiving portion side, and for supporting a load input from the vibration generating portion to the vibration receiving portion. The vibration damping support apparatus includes: a first mounting member connected to one or other of the vibration generating portion or the vibration receiving portion; a second mounting member connected to the other of the vibration generating portion or the vibration receiving portion; a main elastic body, disposed between the first mounting member and the second mounting member, and elastically deforming due to input of a load to the first mounting member or to the second mounting member along a specific load input direction; a stopper member, configured including a facing portion that faces the first mounting member along the load input direction, and load transmission surfaces, formed to portions at both ends of the facing portion in a load orthogonal direction that is orthogonal to the load input direction, the load transmission surfaces extending in a direction intersecting with the load orthogonal direction; load bearing surfaces, formed to the second mounting member so as to face the load transmission surfaces; and a stopper elastic body, manufactured from rubber, bonded to each of the respective load transmission surfaces and the load bearing surfaces, and elastically connecting the stopper member and the second mounting member to each other, with angle θ1 between the load transmission surfaces and the load bearing surfaces of $0° \leq θ1 \leq 45°$.

In the vibration damping support apparatus of the second aspect, the stopper elastic body is bonded to each of the respective load transmission surfaces of the stopper member and the load bearing surfaces of the second mounting member, and elastically connects the stopper member and the second mounting member to each other. The load transmission surfaces are formed at portions of the stopper member disposed to face the first mounting member along the load input direction, portions that are at both ends of in a load orthogonal direction that is orthogonal to the load input direction, and the load transmission surfaces extend in a direction intersecting with the load orthogonal direction. The load bearing surfaces face the load transmission surfaces at the second mounting member, such that the angle θ1 between the load transmission surfaces and the load bearing surfaces is $0° \leq θ1 \leq 45°$.

Consequently, in the vibration damping support apparatus according to the second aspect, when load is input to the first mounting member or to the second mounting member along the load input direction, the main elastic body elastically deforms along the load input direction, and the first mounting member displaces relative to the second mounting member along the load input direction. As this occurs, when the displacement amount of the first mounting member in the load input direction becomes that of the initial separation along the load input direction of the stopper member from the first mounting member, or a greater amount, the first mounting member contacts the stopper member, and load is transferred to the stopper elastic body through the stopper member.

The stopper member, to which load has been applied, elastically deforms in the load input direction between the load transmission surface of the stopper member and the load bearing surfaces of the second mounting member. Since the load transmission surfaces and the load bearing surfaces each extend in a direction that intersects with the load orthogonal direction, and also the angle θ1 between the load transmission surfaces and the load bearing surfaces is $0° \leq θ1 \leq 45°$, it can be set such that the elastic deformation occurring in the stopper elastic body includes a main component of a shear deformation component, and a secondary component of a compressive and tensile deformation component, being slight in comparison to the shear deformation component. Consequently, since a sharp increase in the proportion of the compressive and tensile deformation component can be prevented even when there is an increase in the load applied in the compression direction, a sharp increase in the rigidity and spring constant of the stopper elastic body for an increase in input load can be prevented even when a high load is input with a large displacement amount of the stopper elastic body.

The vibration damping support apparatus according a third aspect of the present invention is the vibration damping support apparatus of the first aspect or the second aspect, wherein the load transmission surfaces and the load bearing surfaces are each formed as flat surfaces extending along the load input direction, namely substantially parallel thereto.

The vibration damping support apparatus according to a fourth aspect of the present invention is the vibration damping support apparatus of the first aspect or the second aspect, wherein the angle θ2 of the load transmission surfaces relative to the load input direction is 0°≦θ2 ≦45°, and the angle θ3 of the load bearing surfaces relative to the load input direction is 0°≦θ3 ≦45°.

The vibration damping support apparatus according to a fifth aspect of the present invention is the vibration damping support apparatus of any one of the first aspect to the fourth aspect, wherein: a pair of load transmission portions are provided to the stopper member so that each extends along the load input direction toward the second mounting member side; first load transmission surfaces and second load transmission surfaces are formed as the load transmission surfaces to end portions of the load transmission portions, respectively on the outside and on the inside in the load orthogonal direction; a load bearing portion is provided to the second mounting member such that the leading end side of the load bearing portion is disposed between the pair of load transmission portions of the stopper member; a pair of first load bearing surfaces is formed as the load bearing surfaces to the second mounting member so to respectively face the pair of first load transmission surfaces of the stopper member along the load orthogonal direction; a pair of second load bearing surfaces is formed as the load bearing surfaces to the load bearing portion so as each to respectively face the pair of second load transmission surfaces along the load orthogonal direction; first elastic connecting portions, provided to the stopper elastic body so as each to be interposed between the respective first load transmission surface and the respective first load bearing surface, bonded respectively to the first load transmission surfaces and the first load bearing surfaces; and second elastic connecting portions, provided to the stopper elastic body so as to each to be interposed between the respective second load transmission surface and the respective second load bearing surface, bonded respectively to the second load transmission surfaces and the second load bearing surfaces.

EFFECT OF THE INVENTION

According to the vibration damping support apparatus of the present invention, as explained above, when the displacement amount of the stopper elastic body is large during input of a high load, a sharp increase in rigidity and dynamic spring constant of the stopper elastic body for an increase in load can be effectively suppressed.

BEST MODE OF IMPLEMENTING THE INVENTION

Figure 1A:
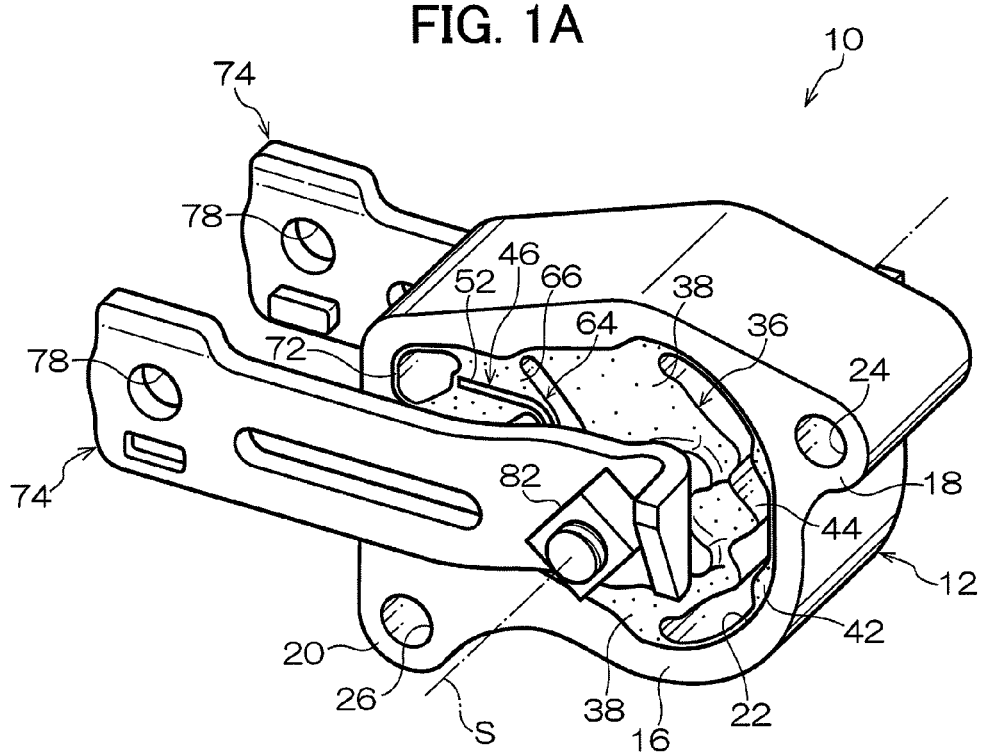
FIG. 1A is a perspective view showing a configuration of a torque rod according to a first exemplary embodiment of the present invention.
Figure 1B:
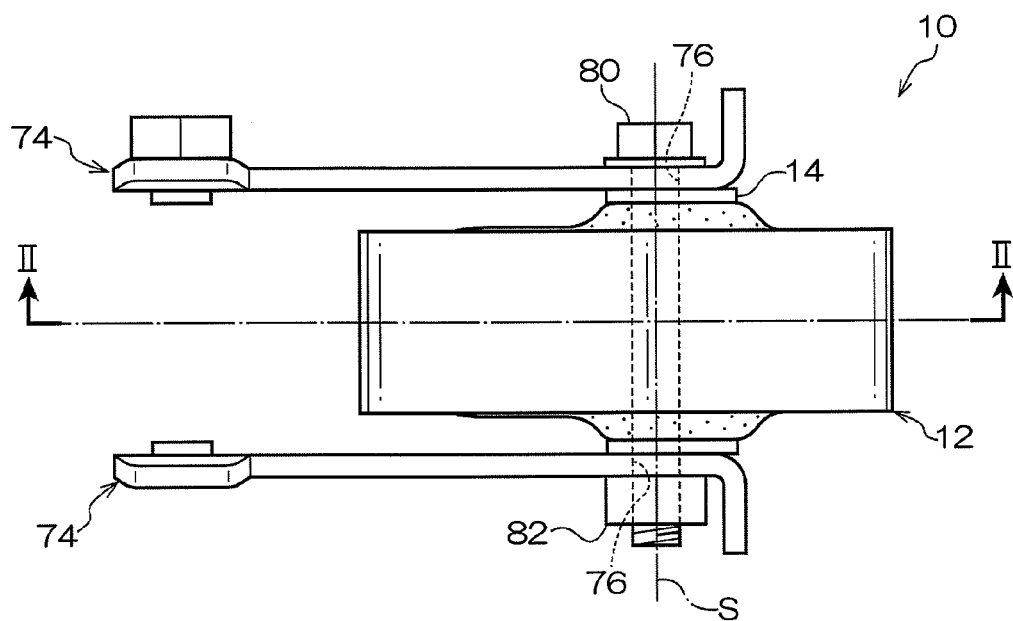
FIG. 1B is a plan view showing a configuration of a torque rod according to a first exemplary embodiment of the present invention.
Figure 2:
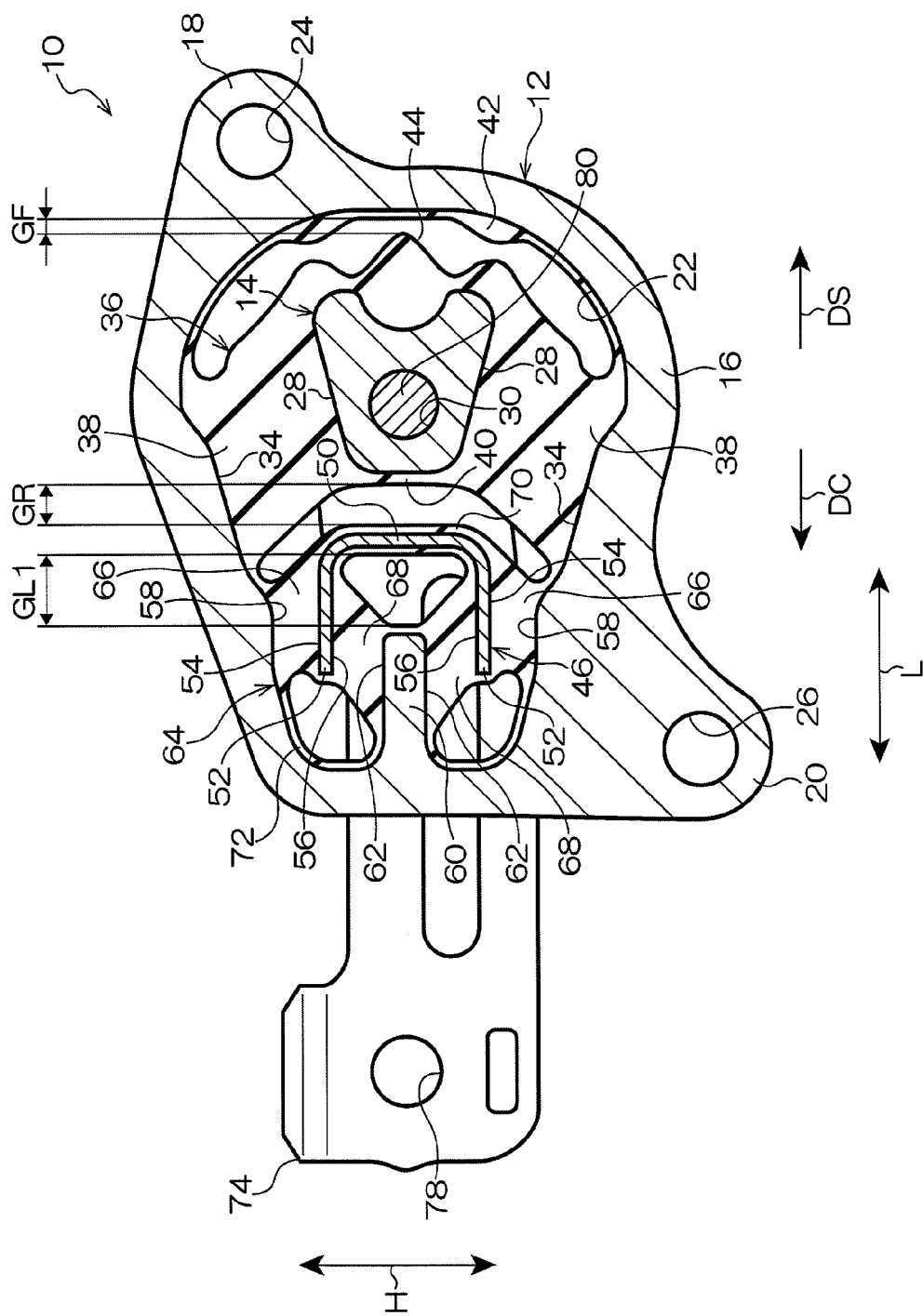
FIG. 2 is a lateral cross-section of the torque rod taken on intermittent line II-II of FIG. 1B.
Figure 3:
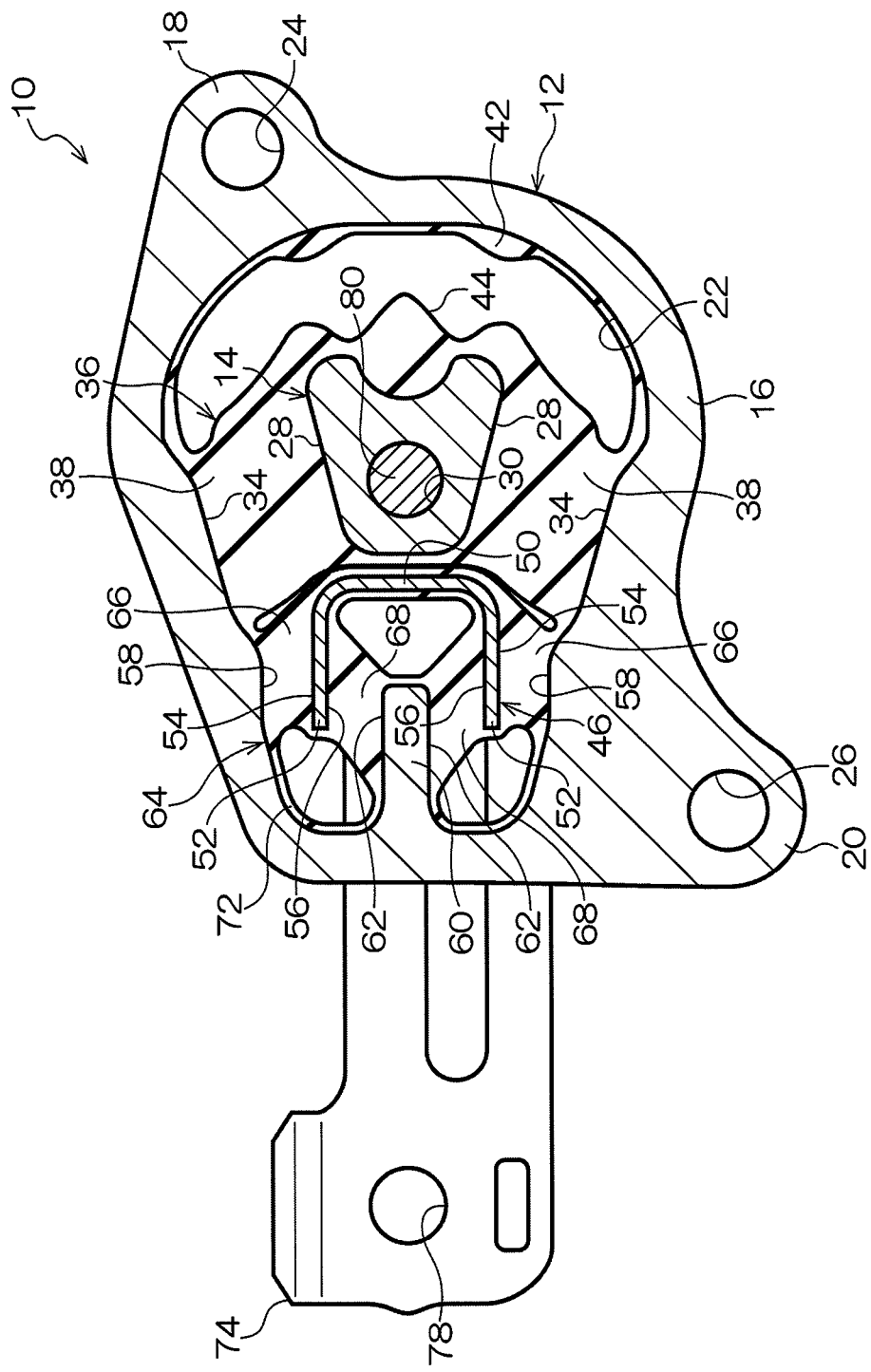
FIG. 3 is a lateral cross-section showing a state in which a load is input to the torque rod shown in FIG. 1 in the compression direction, and an internal fitting has contacted a stopper fitting.

Explanation will now be given of a torque rod according to exemplary embodiments of the present invention, with reference to the figures.
First Exemplary Embodiment
Configuration of the Exemplary Embodiment FIG. 1A, FIG. 1B and FIG. 2 show a torque rod according to a first exemplary embodiment of the present invention. This torque rod 10 is a type of vibration damping support apparatus for mounting a power unit (not shown in the figures), configured to include an engine, transmission, etc., to a vehicle body. For example the torque rod 10 is for elastic connection at the vehicle body side of a transverse power unit supported in a suspended state from a vehicle body by plural engine mounts. When doing so the torque rod 10 is interposed between the rear end of a power unit and a vehicle body, controlling displacement of the power unit mainly in the roll direction, due to reaction to the power unit torque.

An external cylinder fitting 12, formed in a ring shape and serving as a second fitting member, is provided in the torque rod 10, as shown in FIG. 2, and an internal cylinder fitting 14, of cylindrical shape and serving as a first fitting member, is disposed on the inner peripheral side of the external cylinder fitting 12. In the figures the center axis of the internal cylinder fitting 14 is shown with the annotation S, and explanation is given below with the direction along this center axis S as the axial direction of the apparatus. The height direction of the apparatus is shown with the annotation H, and the length direction of the apparatus is shown with the annotation L, and in the attached state of the torque rod 10 to the vehicle the height direction H and the length direction L are respectively substantially aligned with the up-down direction and the front-rear direction of the vehicle.

The external cylinder fitting 12 is, as shown in FIG. 2, integrally formed with: a frame portion 16, with substantially rectangular shape in a cross-section taken along a direction orthogonal to the axial direction; a bracket portion 18, provided along the axial direction and protruding out from an upper portion of the frame portion 16 to the vehicle rear side; and a bracket portion 20, protruding out from a lower portion of the frame portion 16 to the vehicle bottom side in a direction orthogonal to the axial direction. In the external cylinder fitting 12 there is an internal space portion 22 of substantially an egg shape in cross-section on the inner peripheral side of the frame portion 16. The length direction (longest dimension direction) of the internal space portion 22 is aligned with the length direction of the apparatus, with the width of the opening in the height direction relatively widening at the vehicle rear side of the internal space portion 22, and narrowing at the vehicle front side thereof.

Through holes 24, 26 are respectively made so as to pass through the pair of brackets 18, 20, in the axial direction of the external cylinder fitting 12. The external cylinder fitting 12 is fastened to the vehicle body side through bolts (not shown in the figures) inserted through the respective through holes 24, 26 of the pair of brackets 18, 20.

The internal cylinder fitting 14, as shown in FIG. 2, is formed in a substantially trapezoidal shape, with the height direction thereof aligned with the vehicle front-rear direction. The height along the apparatus height direction of the internal cylinder fitting 14 narrows in a taper shape from the vehicle rear side toward the vehicle front side. The internal cylinder fitting 14 is disposed within internal space portion 22 to the vehicle rear side of the center thereof in the length direction thereof. The two end faces in the height direction of the internal cylinder fitting 14 are respectively load transmission surfaces 28, each formed as flat faces inclined to the apparatus length direction. A circular shaped connecting hole 30 is formed passing through the internal cylinder fitting 14 along the axial direction at a central portion thereof.

Load bearing surfaces 34 are formed at each side along the height direction of the inner peripheral surface in the external cylinder fitting 12, the load bearing surfaces 34 formed as surfaces that are each substantially flat and parallel to respective surfaces of the pair of load transmission surfaces 28. Each of the pair of load bearing surfaces 34 is disposed so as to be displaced to the vehicle front side relative to the respective load transmission surface 28.

A main elastic body 36 is disposed in the torque rod 10 between the external cylinder fitting 12 and the internal cylinder fitting 14. The overall shape of the main elastic body 36 is substantially a V-shape in cross-section, opening toward the vehicle front side. Main body portions 38 are formed in the main elastic body 36 between the load bearing surfaces 34 and the load transmission surfaces 28, the main body portion 38 being of substantially a diamond shape in cross-section. Both end faces of the main body portion 38 in the height direction are vulcanize bonded to respective load bearing surfaces 34 of the external cylinder fitting 12 and to respective load transmission surfaces 28 of the internal cylinder fitting 14, elastically connecting the internal cylinder fitting 14 to the external cylinder fitting 12. Consequently, in the torque rod 10 the pair of main body portions 38 in the main elastic body 36 elastically deform when a load is input along the vehicle front-rear direction to the internal cylinder fitting 14 or to the external cylinder fitting 12. When this occurs the elastic deformation occurring in the main body portion 38 becomes a shear-compression deformation, with a main component of a shear deformation component, and a secondary component of a compressive and tensile deformation component.

Integrally formed to the main elastic body 36 are a covering portion 40, vulcanize bonded to the front end face of the internal cylinder fitting 14, and a covering portion 42, vulcanize bonded to a region at the vehicle rear side of the inner peripheral face of the internal space portion 22. There is also a cushioning portion 44, vulcanize bonded to the rear end side of the internal cylinder fitting 14 and integrally formed to the main elastic body 36. A portion at the rear end side of the cushioning portion 44 is a triangular shape in cross-section, with the apex portion thereof projecting out to the vehicle rear side. While doing so the apex portion faces the covering portion 42 vulcanize bonded to the inner peripheral face of the internal space portion 22, with a specific gap GF thereto when in a neutral state in which the main elastic body 36 is not elastically deformed.

A stopper fitting 46 is disposed in the torque rod 10 within the internal space portion 22, as shown in FIG. 2, so as to face the internal cylinder fitting 14. The stopper fitting 46 is disposed within the internal space portion 22 to the vehicle front side of the center in the length direction thereof, and the stopper fitting 46 faces the leading end face of the internal cylinder fitting 14 within the internal space portion 22. The stopper fitting 46 is U-shaped in cross-section, opening toward the vehicle front side, and, for example, is manufactured by press forming from a long thin metal plate. The stopper fitting 46 is provided with a flat plate-shaped contact plate portion 50, extending in the height direction at a leading end portion at the vehicle rear side thereof, and is provided with load transmission portions 52 formed by bending, each extending toward the vehicle rear side from the two end portions of the contact plate portion 50 in the height direction.

The load transmission portions 52 are each formed with a first load transmission surface 54 and a second load transmission surface 56, on the outside and inside respectively in the apparatus height direction, and these load transmission surfaces 54, 56 are each formed as flat surfaces extending parallel to the apparatus length direction L (load input direction L).

In the external cylinder fitting 12, as shown in FIG. 2, first load bearing surfaces 58 are formed at the inner peripheral face of the internal space portion 22 so as to face respective surfaces of the pair of first load transmission surfaces 54 of the stopper fitting 46. Each of the pair of first load bearing surfaces 58 are formed as a flat surface parallel to the pair of first load transmission surfaces 54.

A plate shaped load bearing portion 60 is integrally formed in the external cylinder fitting 12 extending out to the vehicle rear side at a front end portion of the inner peripheral surface of the internal space portion 22, and the leading end side of the load bearing portion 60 is disposed between the pair of load transmission portions 52 of the stopper fitting 46. Second load bearing surfaces 62 are formed at the top face and at the bottom face respectively of the load bearing portion 60 in the height direction, and the surfaces in this pair of second load bearing surfaces 62 respectively face the pair of second load transmission surfaces 56 of the stopper fitting 46, and are respectively formed as flat surfaces parallel to the second load transmission surfaces 56. The leading end face of the load bearing portion 60 faces a first covering portion 70 provided vulcanize bonded at the rear end surface in the apparatus length direction of the contact plate portion 50, with a specific gap GL1 therebetween.

A stopper elastic body 64 is disposed in the torque rod 10 between the external cylinder fitting 12 and the stopper fitting 46. The overall cross-sectional shape of the stopper elastic body 64 is substantially V-shaped, opening toward the vehicle front side. Outer body parts 66 are formed with substantially diamond shaped cross-sections to the stopper elastic body 64, between the first load transmission surfaces 54 and the first load bearing surfaces 58. Inner body parts 68 are also formed with substantially diamond shaped cross-sections to the stopper elastic body 64, between the second load transmission surfaces 56 and the second load bearing surfaces 62.

Each of the two end faces of the outer body parts 66 in the height direction is vulcanize bonded to the respective first load transmission surfaces 54 and the respective first load bearing surface 58, elastically connecting the load transmission portions 52 of the stopper fitting 46 to the external cylinder fitting 12. Each of the two end faces of the inner body part 68 in the height direction is vulcanize bonded to the respective second load transmission surface 56 and the respective second load bearing surface 62, elastically connecting the load transmission portions 52 of the stopper fitting 46 to the load bearing portion 60 of the external cylinder fitting 12.

The thin membrane shaped first covering portion 70 is integrally formed to the stopper elastic body 64, vulcanize bonded to the front and rear surfaces of the stopper fitting 46, and thin membrane shaped second covering portions 72 are also formed to the stopper elastic body 64, vulcanize bonded to regions of the inner peripheral surface of the internal space portion 22 between the load bearing portion 60 and the first load bearing surfaces 58.

In the torque rod 10 the first covering portion 70 vulcanize bonded to the rear surface of the contact plate portion 50 faces the covering portion 40 vulcanize bonded to the leading end face of the internal cylinder fitting 14 with a specific gap GR therebetween when in a neutral state in which the main elastic body 36 is not elastically deformed.

In the torque rod 10, as shown in FIG. 1A and FIG. 1B, a pair of connecting arms 74 is provided, disposed on each side of the internal cylinder fitting 14 in the axial direction. The pair of connecting arms 74 are each formed in a long thin plate shape along the apparatus length direction. Connection holes 76 are provided in the connecting arms 74, passing in the axial direction through leading end portions at the vehicle rear side of the connecting arms 74, and connection holes 78 are provided passing in the axial direction through front end portions of the connecting arms 74. The leading end portions on the inside in the axial direction of the pair of connecting arms 74 contact one or other of the end faces of the internal cylinder fitting 14, and the connection holes 76 align with the connection holes 30 of the internal cylinder fitting 14. A bolt 80 is inserted through the connection holes 76 of the pair of connecting arms 74 and the connection holes 30 of the internal cylinder fitting 14, and a nut 82 is threaded onto a leading end portion of the bolt 80 protruding out from one of the connection holes 76. The leading ends of the pair of connecting arms 74 are each thereby connected to the internal cylinder fitting 14 through the bolt 80 and the nut 82.

The torque rod 10 is connected to the power unit side through bolts (not shown in the figures) inserted into the connection holes 78 in the front end portions of the pair of connecting arms 74. Thereby, in the vehicle the power unit, configured to include engine, transmission, etc., is elastically connected to the vehicle body side. In doing so the leading end portion of the torque rod 10 is at the rear end portion at the vehicle rear side of the power unit, and is fixed at a position on the upper side or lower side of the crankshaft. Thereby, during vehicle acceleration or deceleration a torque reaction is generated in a rolling direction with the crankshaft, the main axis of inertia of the power unit, at the center thereof. This torque reaction is transmitted as a load to the internal cylinder fitting 14, the load being substantially aligned with the length direction of the torque rod 10 (the vehicle front-rear direction). In doing so, in the present exemplary embodiment, the power unit applies a load acting in the compression direction of the torque rod 10 (direction shown by arrow DC in FIG. 2) during vehicle acceleration, and applies a load acting in the tension direction of the torque rod 10 (direction shown by arrow DS in FIG. 2) during vehicle deceleration.

It should be noted that an opposite configuration to that of the present exemplary embodiment may be made, with the external cylinder fitting 12 of the torque rod 10 fixed to the power unit side and the pair of connecting arms 74 fixed to the vehicle side.

Operation of the Present Exemplary Embodiment
Explanation will now be given of the motion and operation of the torque rod 10 according to the present exemplary embodiment, configured as described above.

In the torque rod 10 according to the present exemplary embodiment, the main elastic body 36 between the internal cylinder fitting 14 and the external cylinder fitting 12 is elastically deformed along the vehicle front-rear direction when an applied load in the roll direction is input from the power unit to the internal cylinder fitting 14. The torque rod 10 thereby absorbs load applied from the power unit, and prevents load transmission to the vehicle, as well as applying a reaction force to the power unit as the restoring force of the elastically deformed main elastic body 36, suppressing displacement of the power unit in the roll direction by this restoring force.

In doing so, when vibration, such as idling vibration etc. generated from the power unit during normal vehicle operation, is input to the torque rod 10, such vibration is attenuated and absorbed by elastic deformation of the main elastic body 36, preventing transmission to the vehicle body and suppressing increased displacement of the power unit with the attenuation force of the main elastic body 36.

However, when an impact load or high applied load in the tension direction is input to the torque rod 10 during rapid vehicle deceleration, elastic deformation occurs in the main elastic body 36 in tension direction of the deformation amount corresponding to the gap GF (see FIG. 2), or a greater amount. Namely, the internal cylinder fitting 14 displaces to the vehicle rear side relative to the external cylinder fitting 12 by an amount of gap GF or greater. The cushioning portion 44 of the main elastic body 36 thereby carries out compression deformation on contact with and pressure against the covering portion 42 vulcanize bonded to the external cylinder fitting 12. The torque rod 10 suppresses relative displacement of the internal cylinder fitting 14 to the vehicle rear side by the large restoring force generated by resistance to the high applied load to the compression deformed cushioning portion 44. The torque rod 10 consequently limits displacement in the power unit roll direction occurring with load applied in the tension direction, to within the range of the sum of the gap GF and the compression deformation amount of the cushioning portion 44.

When an impact load or high load applied in the compression direction is input to the torque rod 10 during rapid vehicle acceleration, elastic deformation occurs in the main elastic body 36 in the compression direction of an amount corresponding to the gap GR (see FIG. 2), or a greater amount. Namely, the internal cylinder fitting 14 displaces to the vehicle front side relative to the external cylinder fitting 12 by an amount of gap GR or greater. The front end surface of the internal cylinder fitting 14 contacts the contact plate portion 50 of the stopper fitting 46 through the covering portion 40 and the first covering portion 70, and load applied in the compression direction is transmitted through the stopper fitting 46 to the outer body part 66 and the inner body part 68 of the stopper elastic body 64. The outer body part 66 and the inner body part 68, having received load applied in the compression direction, each elastically deform in the compression direction, and the restoring force corresponding to the amount of deformation acts as a reaction force on the internal cylinder fitting 14, suppressing relative displacement of the internal cylinder fitting 14 to the vehicle front side. The torque rod 10 consequently limits displacement in the power unit roll direction, occurring with load applied in the compression direction, to within the range of the sum of the gap GR and the elastic deformation amount of the body parts 66, 68.

In the torque rod 10 according to the present exemplary embodiment, the outer body parts 66 of the stopper elastic body 64 are vulcanize bonded to the respective first load transmission surface 54 of the stopper fitting 46, and to the respective first load bearing surface 58 of the external cylinder fitting 12. The inner body parts 68 are also vulcanize bonded to the respective second load transmission surface 56 of the stopper fitting 46 and the respective second load bearing surface 62 of the external cylinder fitting 12, and the outer body parts 66 and the inner body parts 68 of the stopper elastic body 64 elastically connect the stopper fitting 46 and the external cylinder fitting 12 to each other.

The first load transmission surfaces 54 and the second load transmission surfaces 56 are each formed as flat surfaces extending parallel to the load input direction, and the first load bearing surfaces 58 and the second load bearing surfaces 62 are also each formed as flat surfaces extending parallel to the load input direction. Thereby, in the torque rod 10, the internal cylinder fitting 14 displaces relative to the external cylinder fitting 12 along the load input direction (the apparatus length direction) to the vehicle front side when load is input to the internal cylinder fitting 14 in the compression direction and the main elastic body 36 elastically deforms. When, during this displacement, the displacement amount of the internal cylinder fitting 14 is the gap GR, or a greater amount, the internal cylinder fitting 14 contacts the contact plate portion 50 of the stopper fitting 46 through the covering portion 40 and the first covering portion 70, and load is transmitted through the stopper fitting 46 to the outer body parts 66 and the inner body parts 68 of the stopper elastic body 64.

In the torque rod 10 the outer body parts 66, to which load applied in the compression direction has been transmitted, elastically deform in the compression direction between the first load transmission surface 54 and the first load bearing surfaces 58, and also the inner body parts 68 elastically deform in the compression direction between the second load transmission surfaces 56 and the second load bearing surfaces 62. The load transmission surfaces 54, 56 of the stopper fitting 46 and the load bearing surfaces 58, 62 of the external cylinder fitting 12 are each formed as a flat surface parallel to the load input direction (load input direction L). The elastic deformation occurring to the outer body parts 66 and the inner body parts 68 of the stopper elastic body 64 can thereby be configured to include a shear deformation component as the main component and a compressive and tensile deformation component as a secondary component, small in relation to the shear deformation component. Hence, in comparison to when the main component of the deformation component of the stopper elastic body 64 is a compression deformation component, a rapid increase in the compressive and tensile component proportion can be effectively suppressed even when the load applied in the compression direction increases. Thus, a sharp increase in rigidity and dynamic spring constant of the stopper elastic body 64 can be effectively prevented even when the deformation amount of the stopper elastic body 64 is large with input of a high load.

As a result, with the torque rod 10 according to the present exemplary embodiment, when a high load is input along the compression direction and an increase in the displacement amount of the internal cylinder fitting 14 along the load input direction is being suppressed by the stopper fitting 46 and the stopper elastic body 64, the rigidity and dynamic spring constant of the stopper elastic body 64 can be prevented from sharply increasing even when there is a large elastic deformation amount of the stopper elastic body 64 in the compression direction. Hence, the ability to block impact loads and vibrations between the power unit and the vehicle body can be prevented from sharply falling.

In a vehicle, a threshold value is set for the displacement amount of the power unit in the roll direction to ensure the power unit is prevented from interfering with the vehicle body when the power unit is displaced in the roll direction. The roll displacement amount of the power unit relative to the torque rod 10 therefore needs to be suppressed so as not to exceed the threshold value. In the torque rod 10 according to the present exemplary embodiment, when excessive load is input in the compression direction and the stopper fitting 46 is displaced in the compression direction by gap GL1, or a greater amount, due to the load transmitted from the internal cylinder fitting 14, the contact plate portion 50 of the stopper fitting 46 contacts the leading end surface of the load bearing portion 60 through the first covering portion 70, and compression direction displacement of the stopper fitting 46 and the internal cylinder fitting 14 is prevented. A specific threshold value for the displacement amount of the power unit in the roll direction is thereby ensured.

Figure 6:
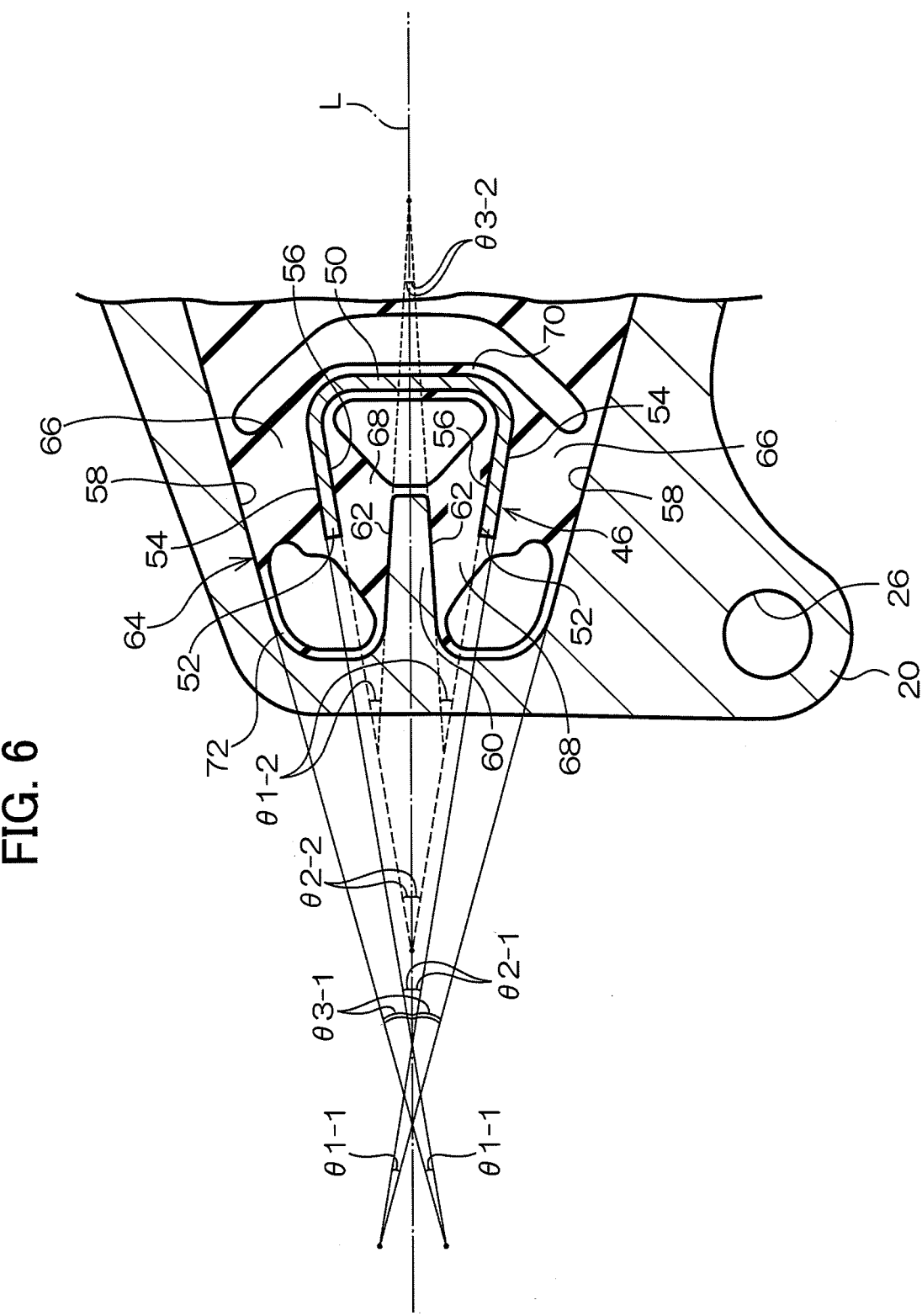
FIG. 6 is a diagram showing the angular relationships between a load bearing portion, a load transmission portion, and a load input portion according to the first exemplary embodiment of the present invention.

Explanation has been given of an example in which the first load bearing surfaces 58, the first load transmission surfaces 54, the second load transmission surfaces 56, and the second load bearing surfaces 62 are parallel to each other, however, there is no requirement for these to always be parallel. It is sufficient for configuration to be made such that when load is input the main component is a shear deformation component (the compressive and tensile deformation component being relatively small relative to the shear deformation component) in the elastic deformation occurring in each of the outer body parts 66 and the inner body parts 68 of the stopper elastic body 64. Namely, if the angle between the first load bearing surfaces 58 and the first load transmission surfaces 54 is $\theta 1\text{-}1$, and the angle between the second load transmission surfaces 56 and the second load bearing surfaces 62 is $\theta 1\text{-}2$ then the following equations should be satisfied (see FIG. 6):

$$0°\leq \theta 1\text{-}1 \leq 45°, \text{ and } 0°\leq \theta 1\text{-}2 \leq 45°.$$

However, from the standpoint of more effective prevention of a rapid increase in the rigidity and dynamic spring constant of the stopper elastic body 64, the shear deformation component should be made even larger relative to the compressive and tensile deformation component, and so it is preferable that:

$$0°\leq \theta 1\text{-}1 \leq 30°, \text{ and } 0°\leq \theta 1\text{-}2 \leq 30°.$$

In addition, explanation has been given in the present exemplary embodiment of an example where the first load bearing surfaces 58, the first load transmission surfaces 54, the second load transmission surfaces 56, and the second load bearing surfaces 62 are parallel to load input direction L, however there is no for these to be parallel thereto.

However, in order that the shear deformation component does not become small relative to the compression deformation component when load is input, if the angle between the first load transmission surface 54 and the load input direction L is $\theta 2\text{-}1$, and the angle between the second load transmission surface 56 and the load input direction L is $\theta 2\text{-}2$, then it is preferable that:

$$0°\leq \theta 2\text{-}1 \leq 45°, \text{ and } 0°\leq \theta 2\text{-}2 \leq 45°,$$

and from the standpoint of more effective prevention of a rapid increase in the rigidity and dynamic spring constant of the stopper elastic body 64, the shear deformation component should be made even larger relative to the compressive and tensile deformation component, and so it is more preferable that $$0°\leq \theta 2\text{-}1 \leq 30°, \text{ and } 0°\leq \theta 2\text{-}2 \leq 30°.$$

In addition, if the angle between the first load bearing surfaces 58 and the load input direction L is $\theta 3\text{-}1$, and the angle between the second load bearing surfaces 62 and the load input direction L is θ3-2, then it is preferable that:

θ3-1≦45°, and θ3-2≦45°, and more preferable that

θ3-1≦30°, and θ3-2≦30°.

Second Exemplary Embodiment
Exemplary Embodiment Configuration

Figure 4:
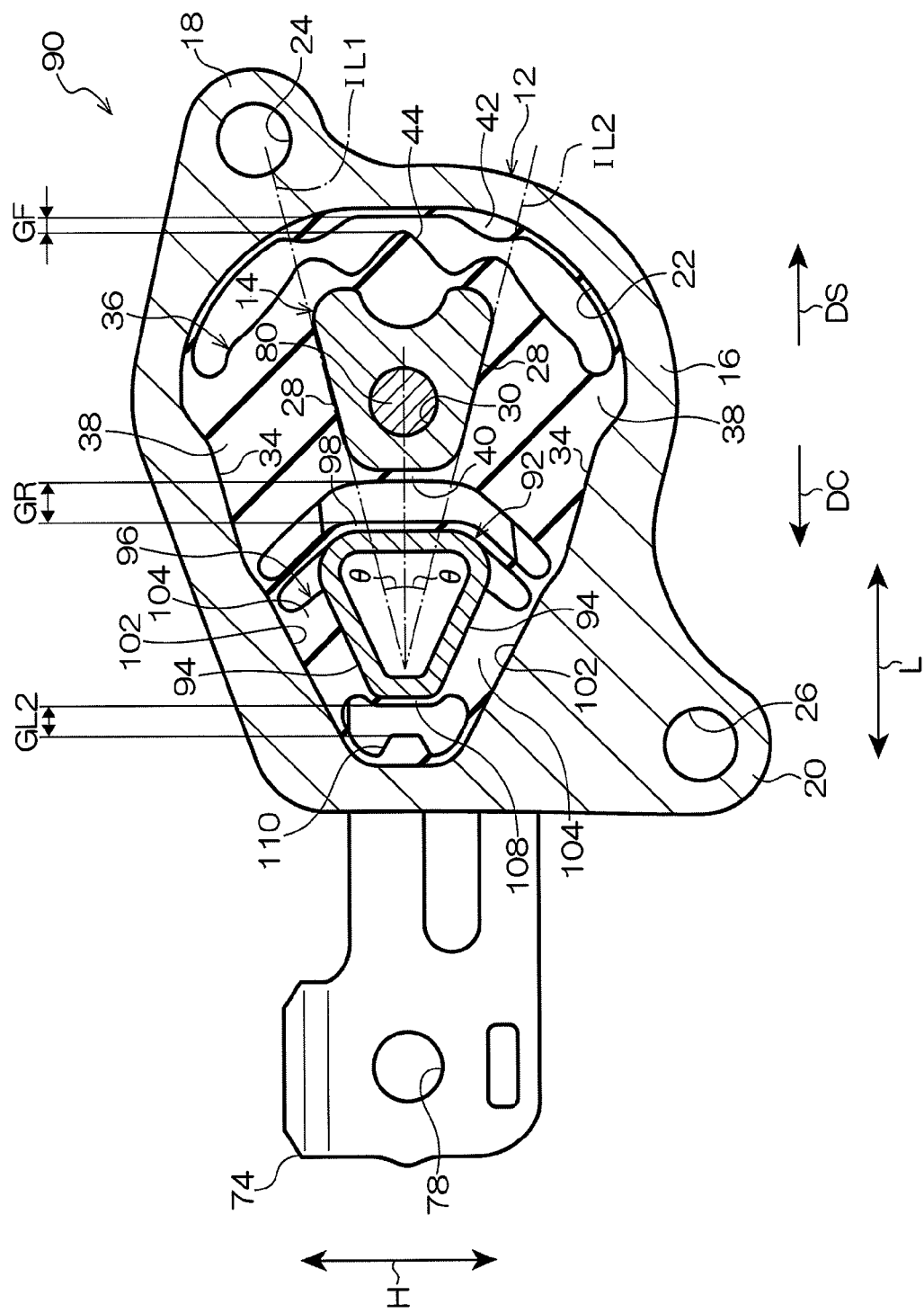
FIG. 4 is a lateral cross-section showing a configuration of a torque rod according to a second exemplary embodiment of the present invention.

A torque rod according to a second exemplary embodiment of the present invention is shown in FIG. 4. This torque rod 90 differs from the torque rod 10 according to the first exemplary embodiment in being configured with a stopper fitting 92, with load transmission surfaces 94 and a stopper elastic body 96 of the external cylinder fitting 12, with other parts of the configuration being essentially the same as in the torque rod 10 according to the first exemplary embodiment. The same reference numbers are hence allocated to portions in the torque rod 90 according to the present exemplary embodiment which are the same as portions in the first exemplary embodiment, and explanation thereof is omitted.

The torque rod 90 has the stopper fitting 92 disposed within the internal space portion 22, facing the internal cylinder fitting 14. The stopper fitting 92 is disposed to the vehicle front side relative to the center in the length direction within the internal space portion 22, and faces the front end surface of the internal cylinder fitting 14 along the apparatus length direction. The stopper fitting 92 is formed in a tubular shape with substantially triangular cross-section, tapering so that the width in the apparatus height direction gets narrower from the vehicle rear side toward the vehicle front side.

The leading end surface on the vehicle rear side of the stopper fitting 92 is formed in a flat plate shape extending in the apparatus height direction, with the leading end surface of the stopper fitting 92 being a contact surface 98, for contact to the internal cylinder fitting 14. Each of the outside and inside faces of the stopper fitting 92 in the apparatus height direction form the respective load transmission surfaces 94, and each of the pair of load transmission surfaces 94 is a flat surface inclined relative to the apparatus length direction (load input direction). Specifically, the pair of the load transmission surfaces 94 is inclined such that imaginary straight lines IL1, IL2 tangential to the pair of load transmission surfaces 94 intersect at the downstream side from the stopper fitting 92 along the compression direction, with angles θ relative to the load input direction each set at appropriate angles within the range of greater than 0° up to 45°.

Load bearing surfaces 102 are formed to the external cylinder fitting 12 at the inner peripheral surface of the internal space portion 22, so as to face respective surfaces of the pair of load transmission surfaces 94 of the stopper fitting 92. Each of the pair of load bearing surfaces 102 is formed as a flat surface parallel to the respective surface of the pair of load transmission surfaces 94.

It should be noted that the load bearing surfaces 102 are not necessarily parallel, and may be formed with an angle to the load transmission surfaces 94 of 0° to 45°.

The stopper elastic body 96 is disposed in the torque rod 90 between the external cylinder fitting 12 and the stopper fitting 92. The stopper elastic body 96 is formed overall in substantially a V shape in cross-section, opening toward the vehicle front side. Body parts 104 are formed to the stopper elastic body 96 between the load transmission surfaces 94 and the load bearing surfaces 102, the body parts 104 being formed in substantially a rectangular shape in cross-section. Both end faces in the height direction of the body parts 104 are vulcanize bonded to the respective load transmission surface 94 and the respective load bearing surface 102, elastically connecting the stopper fitting 92 to the external cylinder fitting 12. A first covering portion 106 and a second covering portion 108 are also formed integrally to the stopper elastic body 96, these being of thin membrane shape vulcanize bonded to the contact surface 98 and to the rear end face of the stopper fitting 92, and a cushion member 110 is integrally formed to stopper elastic body 96, vulcanize bonded to a rear end portion of the inner peripheral surface of the internal space portion 22.

The first covering portion 106 vulcanize bonded to the contact surface 98 faces the covering portion 40 vulcanize bonded to the front end surface of the internal cylinder fitting 14, with a specific gap GR therebetween when the torque rod 90 is in the neutral state with no elastic deformation of the main elastic body 36. In torque rod 90 the second covering portion 108 vulcanize bonded to the front end surface of the stopper fitting 92 faces the leading end of the cushion member 110 vulcanize bonded to the inner peripheral surface of the internal space portion 22, with a specific gap GL2 therebetween in the neutral state in which there is no elastic deformation of the stopper elastic body 96.

Operation of the Second Exemplary Embodiment

Explanation will now be given of motion and operation of the torque rod 90 according to the present exemplary embodiment, configured as described above.

The torque rod 90 according to the present exemplary embodiment operates in the same manner as the torque rod 10 according to the first exemplary embodiment both when a small load is input with a small displacement amount of the internal cylinder fitting 14 in the load input direction, and when an impact or high load is input in the tension direction from the power unit accompanying sudden vehicle deceleration, restricting displacement of the power unit in the roll direction and also preventing transmission of vibration and impact to the vehicle body side.

However, when an impact or high load is input from the power unit in the compression direction accompanying sudden vehicle acceleration, and a large elastic deformation occurs in the main elastic body 36 in the compression direction corresponding to the gap GR, or a greater amount, the front end surface of the internal cylinder fitting 14 contacts the contact surface 98 of the stopper fitting 92 through the covering portion 40 and the first covering portion 106, transmitting load applied in the compression direction to the body parts 104 of the stopper elastic body 96 through the stopper fitting 92. Each of the pair of body parts 104 in the stopper elastic body 96, having received the load applied in the compression direction, elastically deforms in the compression direction, and a reaction force corresponding to the restoring force of the deformation amount acts on the internal cylinder fitting 14, limiting relative displacement of the internal cylinder fitting 14 to the vehicle rear side.

In the present exemplary embodiment, the body parts 104 of the stopper elastic body 96 are vulcanize bonded to the respective load transmission surface 94 of the stopper fitting 92 and to the respective load bearing surface 102 of the external cylinder fitting 12, with the body parts 104 elastically connecting the stopper fitting 92 to the external cylinder fitting 12. The load transmission surface 94 and the load bearing surface 102 are each formed as flat surfaces with intersecting angle θ set within the range of 0° to 45°. The elastic deformation occurring in the pair of body parts 104 of the stopper elastic body 96 can thereby be set to include a main component of a shear deformation component, and a secondary component of a compressive and tensile deformation component, small relative to the shear deformation component. In comparison to a case where the deformation component of the stopper elastic body has a main component of the compression deformation component, a sharp increase in the proportion of the compressive and tensile deformation component can be effectively suppressed even when the load increased in the compression direction, and a sharp increase in each of the rigidity and dynamic spring constant of the stopper elastic body 96 to an increase in input load can be prevented, even when the deformation amount of the stopper elastic body 96 is large during a high load input.

As a result, according to the torque rod 90 of the present exemplary embodiment, in the same manner as with the torque rod 10 according to the first exemplary embodiment, when a high load is input along the compression direction and an increase in the displacement amount of the internal cylinder fitting 14 along the load input direction is being limited by the stopper fitting 92 and the stopper elastic body 96, even if the amount of elastic deformation of the stopper elastic body 96 in the compression direction is great, a sharp increase in rigidity and dynamic spring constant of the stopper elastic body 96 can be suppressed, thereby enabling a sharp fall off to be prevented in the ability to block impact load and vibration between the power unit and the vehicle body.

When this occurs, by adjusting (increasing or decreasing) the intersection angle θ of the load transmission surfaces 94 and the load bearing surfaces 102 to the load input direction, the proportion of compressive and tensile deformation component in the elastic deformation of the stopper elastic body 96 can be respectively varied (increased or decreased). Therefore, for example, as long the intersection angle θ is set sufficiently small, the proportion of compressive and tensile deformation component in the elastic deformation of the stopper elastic body 96 can be made sufficiently small, and the proportion of shear deformation component therein can be made sufficiently large.

In addition, for example, if the proportion of compressive and tensile deformation component in the elastic deformation of the stopper elastic body 96 is increased as the intersection angle θ of the load transmission surfaces 94 and the load bearing surfaces 102 with the load input direction is increased, then the static spring constant of the stopper elastic body 96 to load applied in the compression direction also increases. Therefore, an increase in the displacement amount in the compression direction of the internal cylinder fitting 14 and the stopper fitting 92 during input of a high load can be effectively suppressed, as long as the proportion of the compressive and tensile deformation component is increased by a given amount.

However, when the elastic deformation amount in the compression direction of the stopper elastic body 96 is larger with an increase in the proportion of compressive and tensile deformation component in the elastic deformation of the stopper elastic body 96, the intersection angle θ is preferably set so as not to exceed 30° in consideration of the ability of the torque rod 10 to block vibration and impact, since the proportional increase in the rigidity and dynamic spring constant also gets larger as the deformation amount of the stopper elastic body 96 increases.

In the torque rod 90 according to the present exemplary embodiment, when an excessive load is input in the compression direction, and stopper fitting 92 is displaced in the compression direction by the gap GL2, or a greater amount, by the load transmitted from the internal cylinder fitting 14, the rear end face of the stopper fitting 92 contacts the leading end portion of the cushion member 110 through the second covering portion 108, preventing displacement in the compression direction of the stopper fitting 92 and the internal cylinder fitting 14. A specific threshold value for the displacement amount of the power unit in the roll direction is thereby ensured.

EXAMPLES

Figure 5:
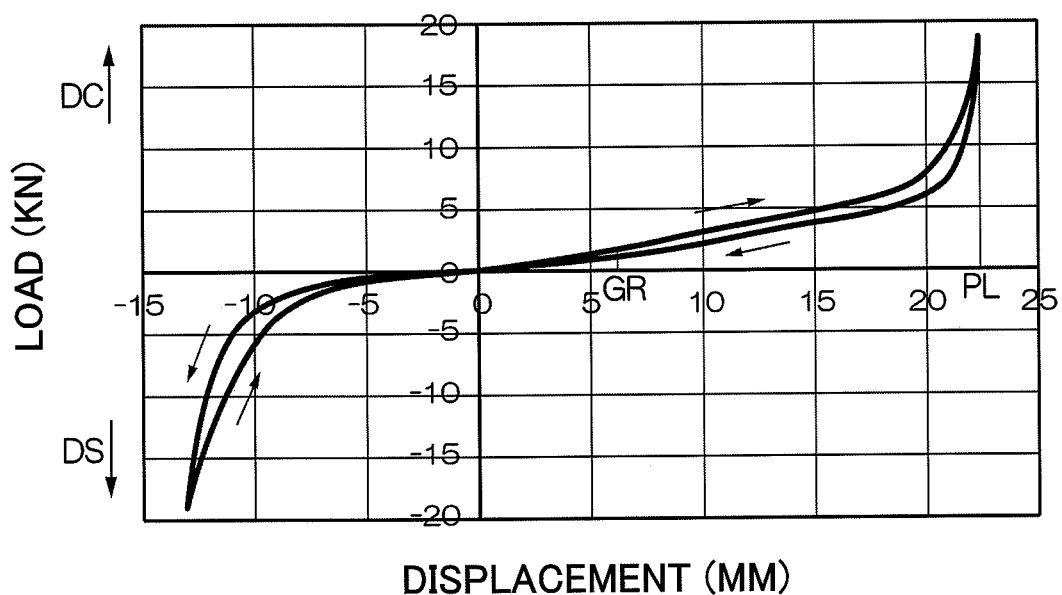
FIG. 5 is a graph of load against deflection when loads act on a torque rod according to the first exemplary embodiment in the direction of compression and in the direction of tension, respectively.

A load-deflection graph is shown in FIG. 5, for loads acting on the torque rod 10 according to the first exemplary embodiment of the present invention, in the compression direction and the tension direction, respectively.

When the load acts on the torque rod 10 in the compression direction, as is clear from FIG. 5, the displacement amount of the internal cylinder fitting 14 increases as the load increases. As this occurs the displacement amount of the internal cylinder fitting 14 increases up to the gap GR, and the internal cylinder fitting 14 contacts the stopper fitting 46, and the stopper elastic body 64 elastically deforms in the compression direction due to the load transmitted thereto by through the stopper fitting 46. Consequently the spring constant (static spring constant) of the torque rod 10 overall increases, and the spring constant of the torque rod 10 overall increases linearly with increase in load for the wide range prior to point LP, when the stopper fitting 46 contacts the load bearing portion 60.

The invention claimed is:

1. A vibration damping support apparatus for elastically connecting a vibration generating portion to a vibration receiving portion, and for supporting a load input from the vibration generating portion to the vibration receiving portion, the vibration damping support apparatus comprising:

a first mounting member connected to one of the vibration generating portion or the vibration receiving portion;

a second mounting member, disposed at an outer perimeter of the first mounting member, and connected to the other of the vibration generating portion or the vibration receiving portion;

a main elastic body, disposed between the first mounting member and the second mounting member, and elastically deforming due to input of a load to the first mounting member or to the second mounting member along a specific load input direction;

a stopper member having an outer peripheral surface disposed so as to face the first mounting member along the load input direction;

load transmission surfaces, formed at portions at both ends of the stopper member in a load orthogonal direction that is orthogonal to the load input direction, the load transmission surfaces extending in a direction intersecting with the load orthogonal direction;

load bearing surfaces, formed at the second mounting member such that the load bearing surfaces respectively face the load transmission surfaces and are parallel to the load transmission surfaces; and a stopper elastic body, manufactured from rubber, bonded to each of the respective load transmission surfaces and the load bearing surfaces, and elastically connecting the stopper member and the second mounting member to each other, wherein a specific gap is formed between the first mounting member and the stopper member.

2. The vibration damping support apparatus of claim 1, wherein the load transmission surfaces and the load bearing surfaces are each formed as flat surfaces extending along the load input direction.

3. The vibration damping support apparatus of claim 2, wherein:
- a pair of load transmission portions are provided to the stopper member so that each extends along the load input direction toward the second mounting member;
- first load transmission surfaces and second load transmission surfaces are formed as the load transmission surfaces to respective end portions of the load transmission portions on an outside and on an inside of the stopper member in the load orthogonal direction;
- a load bearing portion is provided to the second mounting member such that a leading end side of the load bearing portion is disposed between the pair of load transmission portions of the stopper member;
- a pair of first load bearing surfaces is formed as the load bearing surfaces to the second mounting member so as to respectively face a pair of first load transmission surfaces of the stopper member along the load orthogonal direction;
- a pair of second load bearing surfaces is formed as the load bearing surfaces to the load bearing portion so as each to respectively face a pair of second load transmission surfaces along the load orthogonal direction;
- first elastic connecting portions, provided to the stopper elastic body so as each to be interposed between a respective first load transmission surface and a respective first load bearing surface, bonded respectively to the first load transmission surfaces and the first load bearing surfaces; and
- second elastic connecting portions, provided to the stopper elastic body so as each to be interposed between a respective second load transmission surface and a respective second load bearing surface, bonded respectively to the second load transmission surfaces and the second load bearing surfaces.

4. The vibration damping support apparatus of claim 1, wherein an angle $\theta 2$ of the load transmission surfaces relative to the load input direction is from $0° \leqq \theta 2 \leqq 45°$, and an angle $\theta 3$ of the load bearing surfaces relative to the load input direction is from $0° \leqq \theta 3 \leqq 45°$.

5. The vibration damping support apparatus of claim 4, wherein:
- a pair of load transmission portions are provided to the stopper member so that each extends along the load input direction toward the second mounting member;
- first load transmission surfaces and second load transmission surfaces are formed as the load transmission surfaces to respective end portions of the load transmission portions on an outside and on an inside of the stopper member in the load orthogonal direction;
- a load bearing portion is provided to the second mounting member such that a leading end side of the load bearing portion is disposed between the pair of load transmission portions of the stopper member;
- a pair of first load bearing surfaces is formed as the load bearing surfaces to the second mounting member so as to respectively face a pair of first load transmission surfaces of the stopper member along the load orthogonal direction;
- a pair of second load bearing surfaces is formed as the load bearing surfaces to the load bearing portion so as each to respectively face a pair of second load transmission surfaces along the load orthogonal direction;
- first elastic connecting portions, provided to the stopper elastic body so as each to be interposed between a respective first load transmission surface and a respective first load bearing surface, bonded respectively to the first load transmission surfaces and the first load bearing surfaces; and
- second elastic connecting portions, provided to the stopper elastic body so as each to be interposed between a respective second load transmission surface and a respective second load bearing surface, bonded respectively to the second load transmission surfaces and the second load bearing surfaces.

6. The vibration damping support apparatus of claim 1, wherein:
- a pair of load transmission portions are provided to the stopper member so that each extends along the load input direction toward the second mounting member;
- first load transmission surfaces and second load transmission surfaces are formed as the load transmission surfaces to respective end portions of the load transmission portions on an outside and on an inside of the stopper member in the load orthogonal direction;
- a load bearing portion is provided to the second mounting member such that a leading end side of the load bearing portion is disposed between the pair of load transmission portions of the stopper member;
- a pair of first load bearing surfaces is formed as the load bearing surfaces to the second mounting member so as to respectively face a pair of first load transmission surfaces of the stopper member along the load orthogonal direction;
- a pair of second load bearing surfaces is formed as the load bearing surfaces to the load bearing portion so as each to respectively face a pair of second load transmission surfaces along the load orthogonal direction;
- first elastic connecting portions, provided to the stopper elastic body so as each to be interposed between a respective first load transmission surface and a respective first load bearing surface, bonded respectively to the first load transmission surfaces and the first load bearing surfaces; and
- second elastic connecting portions, provided to the stopper elastic body so as each to be interposed between a respective second load transmission surface and a respective second load bearing surface, bonded respectively to the second load transmission surfaces and the second load bearing surfaces.

7. A vibration damping support apparatus for elastically connecting a vibration generating portion to a vibration receiving portion, and for supporting a load input from the vibration generating portion to the vibration receiving portion, the vibration damping support apparatus comprising:
- a first mounting member connected to one of the vibration generating portion or the vibration receiving portion;
- a second mounting member, disposed at an outer perimeter of the first mounting member, and connected to the other of the vibration generating portion or the vibration receiving portion;
- a main elastic body, disposed between the first mounting member and the second mounting member, and elastically deforming due to input of a load to the first mounting member or to the second mounting member along a specific load input direction;
- a stopper member, configured including
  - a facing portion at an outer peripheral surface of the stopper member that faces the first mounting member along the load input direction, and
  - load transmission surfaces, formed at portions at both ends of the facing portion in a load orthogonal direction that is orthogonal to the load input direction, the load transmission surfaces extending in a direction intersecting with the load orthogonal direction;

load bearing surfaces, formed at the second mounting member such that the load bearing surfaces respectively face the load transmission surfaces; and a stopper elastic body, manufactured from rubber, bonded to each of the respective load transmission surfaces and the load bearing surfaces, and elastically connecting the stopper member and the second mounting member to each other, with angle θ1 between the load transmission surfaces and the load bearing surfaces of $0° \leq θ1 \leq 45°$, wherein a specific gap is formed between the first mounting member and the stopper member.

8. The vibration damping support apparatus of claim 7, wherein the load transmission surfaces and the load bearing surfaces are each formed as flat surfaces extending along the load input direction.

9. The vibration damping support apparatus of claim 7, wherein an angle θ2 of the load transmission surfaces relative to the load input direction is from $0° \leq θ2 \leq 45°$, and an angle θ3 of the load bearing surfaces relative to the load input direction is from $0° \leq θ3 \leq 45°$.

10. The vibration damping support apparatus of claim 7, wherein:

a pair of load transmission portions are provided to the stopper member so that each extends along the load input direction toward the second mounting member;

first load transmission surfaces and second load transmission surfaces are formed as the load transmission surfaces to respective end portions of the load transmission portions on an outside and on an inside of the stopper member in the load orthogonal direction;

a load bearing portion is provided to the second mounting member such that a leading end side of the load bearing portion is disposed between the pair of load transmission portions of the stopper member;

a pair of first load bearing surfaces is formed as the load bearing surfaces to the second mounting member so as to respectively face a pair of first load transmission surfaces of the stopper member along the load orthogonal direction;

a pair of second load bearing surfaces is formed as the load bearing surfaces to the load bearing portion so as each to respectively face a pair of second load transmission surfaces along the load orthogonal direction;

first elastic connecting portions, provided to the stopper elastic body so as each to be interposed between a respective first load transmission surface and a respective first load bearing surface, bonded respectively to the first load transmission surfaces and the first load bearing surfaces; and second elastic connecting portions, provided to the stopper elastic body so as each to be interposed between a respective second load transmission surface and a respective second load bearing surface, bonded respectively to the second load transmission surfaces and the second load bearing surfaces.

\* \* \* \* \*